United States Patent Office 3,105,772
Patented Oct. 1, 1963

3,105,772
PROCESS FOR THE DEPOSITION OF PRECIOUS METALS ON GLASS AND ON VITRIFIED CERAMICS, AND PRODUCTS OBTAINED BY THIS PROCESS
Jean-Emile-Joseph Loiseleur, Paris, France, assignor to Union des Verreries Mecaniques Belges Societe Anonyme, Charleroi, Belgium, a Belgian company
No Drawing. Filed Oct. 15, 1959, Ser. No. 846,559
Claims priority, application Belgium Oct. 24, 1958
7 Claims. (Cl. 117—35)

The present invention concerns the metallization of glass and of vitrified ceramic by means of precious metals, such as notably gold and metals of the platinum group, namely platinum, rhodium, iridium, osmium, palladium and ruthenium, or by means of one alloy of one or more of these metals.

The object of the invention resides on the one hand in a process by which this metallization can be carried out with a particularly high degree of utilization of the metals in question. Thus, it is possible by means of the process of the invention to reduce, for example by one half and more, the quantity by weight of the salts of precious metals which has heretofore been necessary for the formation of a deposit on these metals.

On the other hand, the invention relates to the industrial products obtained by the said process.

According to the invention, the high utilization yield of the salts of the precious metals to be deposited is obtained by means of a treatment of the surface to be metallized, by which there are imparted ot the latter catalytic properties with respect to such a suitable composition of the solution of salts of precious metals to be deposited that the precipitation of the precious metal takes place solely on the surface to be coated.

The treatment by which catalytic properties with respect to the metallizing bath are applied to the surface to be metallized is not novel per se, since it is known to form on glass articles to be gilded, prior to their gilding, for example, a layer of highly adhesive adsorbed ions by means of a treatment of the said articles with a stannous solution, followed by a treatment with a silver hydrate solution or a solution of a hydrate of another noble metal.

A simplified flow diagram of the method follows:

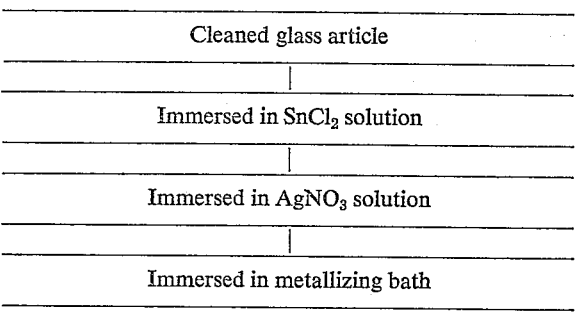

Now, the process according to the invention consists in that this preparatory treatment, which produces on the article to be metallized a coating having catalytic properties in relation to the final metallizing bath, is used in a novel manner by combining it with the utilization, as final metallizing baths, of very dilute solutions containing, in the metastable state, the salt of any one of the precious metals envisaged, as also an appropriate special reducing agent such that the deposition of the precious metal takes place only on the catalyzing layer and that the yield of precious metal from the operation is brought to the neighborhood of unity (100%).

This remarkable result is attained in accordance with the invention by the combination of the following operations:

There is fixed on the articles of glass or vitrified ceramic, first, an intermediate colloid adsorbable on the vitrified surface, such as a colloidal metallic hydrate, for example stannic hydrate $SnO_2.nH_2O$, or any other colloidal metallic hydrate, with the exception of the hydrates of the alkaline-earth metals;

The glass or vitrified ceramic thus treated is coated with a colloidal dispersion of noble metal, for example silver, and the intermediate film thus formed is subjected to a treatment with a final metallizing bath containing at least one special reducing agent, which forms a feature of the invention, and which consists of a compound having as its essential properties that it forms with the solution of the salt of a precious metal to be deposited a metastable or relatively stable mixture, and that it is the effect of causing the reducing reaction of the salt of precious metal present in the said solution to be catalyzed by the said intermediate film of metallic hydrate and of colloidal noble metal, in such manner that the precipitation of the precious metal, accompanying the said reduction, takes place solely on the prepared surface of the article, without formation of mud or of parasitic granular deposit.

The reducing agents added in accordance with the invention to the final metallizing bath advantageously consist either of a mineral peroxide, such for example as hydrogen peroxide, sodium peroxide, etc., or of an organic peroxide, such for example as benzoyl peroxide, etc., or of a hydrazonium derivative, such for example as hydrazine in the form of a hydrate or a hydrochloride.

With regard to the proportions or concentrations of the various ingredients employed in accordance with the invention in the final metallizing baths, these proportions may vary within wide limits, depending upon the nature of the precious metal employed, and upon the characteristics of the final metallizing deposit which it is desired to obtain.

In the case of gilding and rhodium-coating, it may be mentioned by way of example that with a surface of one-square decimetre and a volume of final metallizing bath of 1 litre, industrially advantageous results are obtained with the following proportions of the respective ingredients:

Gilding:
$AuCl_3$ _____ 50 mg.
KOH _____ 50 mg. to 200 mg.
$H_2O_2$ _____ 200 mg. to 1000 mg.

Rhodium-coating:
$Na_3RhCl_6$ _____ 0.50 g. to 1 g.
$NH_4OH$ _____ 1.00 g. to 4 g.
KOH _____ 0.50 g. to 2 g.
Hydrazine hydrate _____ 0.50 g. to 2 g.

The final metallizing baths consisting of a dilute aqueous solution of a salt of the metal to be deposited and of at least one of the above-mentioned special reducing agents remain stable for several hours to several days, depending upon circumstances, during which time no reduction is observed. However, if the article to be metallized, which has been successively treated with solutions of SnCl₂ and AgNO₃ is dipped therein, the AgSNO₃ film by which they are coated catalyses the reducing reaction in such manner that the latter takes place exclusively on the surface of the article to be metallized.

No deposition on the receptacle occurs, even if the latter consists of glass. There is no mud formation and no loss of precious metal. The yield of the precious metal is therefore maximum. Moreover, the solution may be used a large number of times and may even be periodically regenerated when it has become impoverished. Finally, the concentrations of solutions of metallic salts employed in accordance with the invention for the final metallization may be such that the manipulations can be readily performed and that the successive re-enrichments of the baths require only small quantities of reactant.

The metallic deposits formed in accordance with the invention are much more even than those obtained by the known processes, because they are due to reactions which occur only on contact with the surface to be coated.

The process of the invention is advantageous as compared with the aforesaid known process, because in the latter a meta-stable final metallizing solution is not employed, so that in the said known process the precious metal is deposited not only on the surface to be metallized, but also on the walls of the receptacle and mainly on the bottom of the latter, in the form of muds. In addition, in the known process the final metallizing solution cannot be re-used, since the addition of the reducing agent produces therein the total precipitation of the precious metal contained in the bath.

EXAMPLES

Gilding

For effecting the gilding of a flat glass article having a surface of 1 square dm., previously cleaned in a manner known per se, it is immersed for 3 minutes in a tank containing an SnCl₂ solution having a concentration between 1 and 10 g. per litre in water.

It is thereafter rinsed with water and then immersed in an aqueous AgNO₃ solution having a concentration of from 0.05 to 2 g. per litre, for two minutes.

It is rinsed with water and then introduced into the final metallizing bath having one of the following compositions:

| | |
|---|---|
| AuCl₃ | 50 mg. |
| KOH | 50 mg. to 200 mg. |
| H₂O₂ | 200 mg. to 1000 mg. |
| Water | 1 litre. |

When the metallizing layer has reached the desired thickness on the flat glass article undergoing the treatment, the latter is withdrawn from the bath and rinsed with water.

Rhodium-Coating

The surface of the glass to be rhodium-coated, which has an area of 1 square dm. and is carefully cleaned in a manner known per se, is immersed for about 3 minutes in an aqueous SnCl₂ solution having a concentration of from 1 to 10 g. per litre, whereafter it is washed with water.

It is then treated for several seconds with 100 cc. of an ammonium-silver plating solution containing from 100 to 500 mg. of AgNO₃ and a corresponding quantity of organic reducing agent consisting, for example, of an aqueous alcoholic solution of saccharose and tartaric acid.

The article is thereafter washed with water and introduced into the rhodium-coating bath, which has one of the following compositions:

| | |
|---|---|
| Na₃RhCl₆ | 0.50 g. to 1.00 g. |
| NH₄OH | 1.00 g. to 4.00 g. |
| KOH | 0.50 g. to 2.00 g. |
| Water | 1 litre. |
| Hydrazine hydrate | 0.50 g. to 2.00 g. |

The rhodium-coating bath is heated on a water bath at temperatures between 50° and 90° C. When the metallizing layer has reached the desired thickness on the glass undergoing the treatment, the latter is withdrawn from the bath and rinsed with water.

In the two series of examples hereinbefore given, no muds or deposits remain in the receptacle containing the final metallizing bath after completion of the final metallization, and the bath itself is clear and can be used for a further final metallization, if desired after its reactant and water contents have been restored to the desired extent to the values hereinbefore indicated by way of example.

I claim:

1. A process for the metallization of a glass or vitrified ceramic object comprising fixing on said objects an intermediate colloidal hydrate of a metal other than an alkaline earth metal and a colloidal dispersion of a noble metal to form an intermediate film on said object, and exposing said filmed object to a final metallizing bath including less than about 0.1% by weight of a salt of a precious metal selected from the group consisting of gold, platinum, rhodium, iridium, osmium, palladium, ruthenium and mixtures thereof and a reducing agent selected from the group consisting of peroxides and hydrazonium derivatives, said agent capable of reducing said salt to said precious metal only on contact with said film whereby said object is metallized with said precious metal without formation of reduced precious metal other than on the surface of said object.

2. A process for the metallization of a glass or vitrified ceramic object comprising fixing on said objects an intermediate colloid of a colloidal metallic hydrate other than alkaline earth metals and a colloidal dispersion of silver to form an intermediate film on said object, and exposing said filmed object to a final metallizing bath including less than about 0.1% by weight of a salt of a precious metal selected from the group consisting of gold, platinum, rhodium, iridium, osmium, palladium, ruthenium and mixtures thereof and a reducing agent selected from the group consisting of peroxides and hydrazonium derivatives, said agent capable of reducing said salt to said precious metal only on contact with said film whereby said object is metallized with said precious metal without formation of reduced precious metal other than on the surface of said object.

3. A glass or ceramic article metallized by the process of claim 2.

4. A process for gilding a glass object comprising exposing said object to a solution of SnCl₂, thereafter exposing said article to a solution of AgNO₃, and subsequently placing said article in a water bath including about 0.005% by weight of AuCl₃, KOH and H₂O₂ until the desired thickness of gold has deposited on said article whereby said article is gilded without formation of reduced gold other than on the surface of said glass.

5. A glass or ceramic article metallized by the process of claim 4.

6. A process for rhodium coating a glass object comprising exposing said object to a solution of SnCl₂, thereafter exposing said article to a solution of ammoniacal AgNO₃ with a reducing agent, and subsequently placing said article in a water bath including less than about 0.1% by weight of Na₃RhCl₆, NH₄OH, KOH and hydrazone hydrate until the desired thickness of rhodium has deposited on said article whereby said article is rhodium coated without formation of reduced rhodium other than on the surface of said glass.

7. A glass or ceramic article metallized by the process of claim 6.

References Cited in the file of this patent

UNITED STATES PATENTS

| | | | |
|---|---|---|---|
| 2,454,610 | Narcus | Nov. 23, | 1948 |
| 2,639,999 | McLean | May 26, | 1953 |
| 2,702,253 | Bergstrom | Feb. 15, | 1955 |
| 2,757,104 | Howes | July 31, | 1956 |
| 2,762,714 | Smith et al. | Sept. 11, | 1956 |
| 2,822,289 | Millard | Feb. 9, | 1958 |
| 2,871,139 | Wein | Jan. 27, | 1959 |
| 2,955,958 | Brown | Oct. 11, | 1960 |

FOREIGN PATENTS

| | | |
|---|---|---|
| 453,028 | Canada | Nov. 30, 1948 |
| 157,379 | Great Britain | Apr. 6, 1922 |